Figure 1:
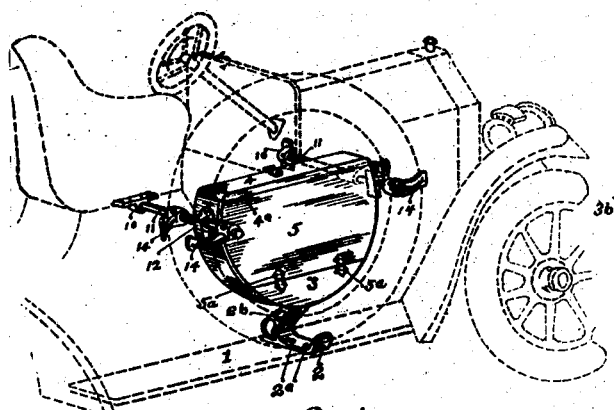

J. C. TEMPLE.
COMBINED TIRE SUPPORT AND TOOL CASE.
APPLICATION FILED OCT. 12, 1909.

1,008,680.  Patented Nov. 14, 1911.

Witnesses

Inventor.
John C Temple
By _____ Attorney

UNITED STATES PATENT OFFICE.

JOHN C. TEMPLE, OF WHITEFIELD, NEW HAMPSHIRE.

COMBINED TIRE-SUPPORT AND TOOL-CASE.

1,008,680.  Specification of Letters Patent.  Patented Nov. 14, 1911.

Application filed October 12, 1909. Serial No. 522,325.

*To all whom it may concern:*

Be it known that I, JOHN C. TEMPLE, a citizen of the United States, residing at Whitefield, in the county of Coos and State of New Hampshire, have invented certain new and useful Improvements in Combined Tire-Supports and Tool-Cases, of which the following is a specification.

The present invention relates to an attachment for automobiles and the like and has for its object the provision of instrumentalities adapted for the support of spare wheels or tires and the usual tools incident to the repair of the vehicle, and to this end the invention may be said to comprise a combination repair kit and tire support with novel means for attachment to the vehicle frame.

Various means have been devised for the support of the tools necessary to be carried with the automobile, the most customary form perhaps being a box or receptacle placed on the running board or other portion of the frame, sometimes beneath the seats, and in which the tools are adapted to loosely rest. Such constructions, and all prior constructions with which I am familiar, have many disadvantages and objectionable features, among which may be noted the continual rattling of the tools while the vehicle is in motion, the inaccessibility of the tools and spare tires, and the inconvenience and annoyance incident to removing the occupants from the seats of the vehicle while the vehicle is being repaired.

More particularly, the present invention comprises novel supporting instrumentalities for an improved type of repair kit, and associated means for the support of the spare wheels or tires, whereby both are positioned at a location to be at all times readily and independently accessible to the operator, and this without disturbing the occupants of the vehicle.

The invention also includes a novel form of kit whereby the contained tools are devoid of the usual rattling and noise, the same being maintained in pre-arranged order, and in a position to be instantly found and removed for use without disturbing the other tools.

Further, the invention includes means whereby the spare wheel or extra tire may be quickly released from the support for use, and this without disturbing the position of the repair kit carried by the support for the spare wheels or tires.

The invention also contemplates a novel form of tire support which is adjustable to accommodate a plurality of supporting wheels or tires, and which when adjusted will constitute a substantially rigid and firm support for the tires and wheels, and one readily releasable.

Other novel features in the construction and arrangement of the parts will be pointed out in the detail description following, which for a clear understanding of the invention should be read in connection with the accompanying drawings forming a part hereof and wherein a satisfactory embodiment of the invention is shown for the purpose of illustration.

Figures 2, 3:
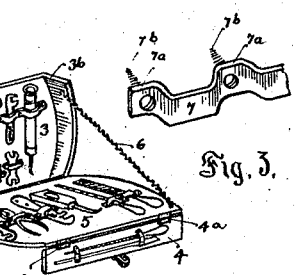
Figure 4:
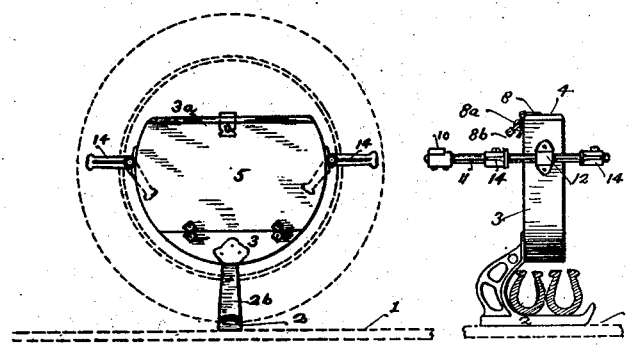
Figure 6:
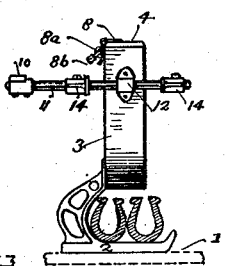
Figure 9:
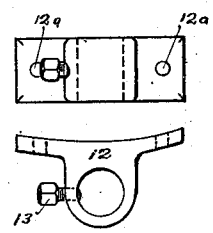
Figures 5, 7:
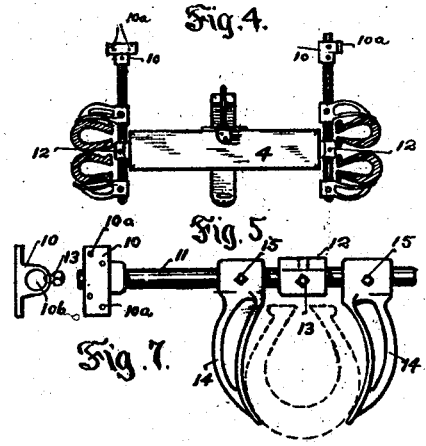
Figure 8:
Figures 10, 11:
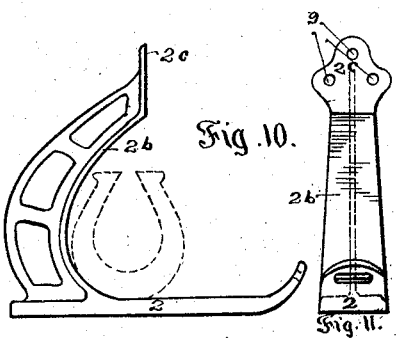

In the drawings, Figure 1 is a perspective view of the attachment disclosing the spare tire and tool case in position on the vehicle, the tool case or kit being closed; Fig. 2 is a perspective view of the tool case or kit removed and open for the purpose of illustrating more clearly the operative position of the case when in use, and the retaining means for the individual tools; Fig. 3 is a detail view of the retaining means for the tools; Fig. 4 is a front elevation of the tool case and tire support with a portion of the runway of the vehicle cut away; Fig. 5 is a top plan view of the tool case and tire supports, the latter being disclosed as holding a plurality of such tires; Fig. 6 is an end or side view of the tool case and tire supports, together with the attaching means for each; Fig. 7 is a detail view of the tire clamping means and support therefor; Fig. 8 is a side view of one of said clamps with the securing means therefor; Figs. 9, 10 and 11 are detail enlarged views of parts removed.

Referring now more particularly to the drawings wherein like reference characters designate corresponding parts throughout the several views, 1 is the ordinary running board of a motor vehicle or the like and resting upon said board is a foot bracket or rest 2, secured in position in any desired manner, as by means of screws or bolts 2$^a$. The bracket 2 has an upward extension 2$^b$ at the rear end thereof terminating in a flat portion 2$^c$ (Figs. 10—11) adapted to rest flat against the rear side of the tool case or kit about to be described. The tool case or kit comprises a box shaped receptacle 3 conveniently curved at its sides and bottom to correspond to the curvature of a tire or spare wheel whereby the same may fit within the latter when in position. The case 3 conveniently has a straight upper edge 3ª, and the upper terminals 3ᵇ of the sides constitute with said upper edge 3ª a support upon which rests a removable top 4. The said top 4 has a pivotal connection at 4ª with a front 5 which latter has a pivotal connection at 5ª with the body portion of the case, whereby the same may swing outwardly and downwardly into a flat position at substantially right angles to the normal position of the case when the inner surface of the front, as well as the interior of the body portion of the case will be exposed to view. The downward swinging movement of the front 5 is limited and the front is firmly supported in lowermost position by a chain or chains 6 connected respectively in any convenient manner to the body portion of the case and said front. The top member 4 of the case is pivoted to swing in opposite directions, whereby when in closed position it will constitute a cover for the top of the casing and when the front is in lowered position the top may swing downwardly to a point at substantially right angles to the front when its inner surface is also exposed to view. Arranged at suitable intervals upon the interior surface of the rear wall of the tool casing, and upon the inner surface of the swinging front and top of the casing are suitable retaining means, preferably one for each of the usual tools carried with the vehicle for repair purposes.

The retaining means just mentioned conveniently comprises leather loop members 7 having feet 7ª secured to the several parts of the casing preferably by screws 7ᵇ. It will be noted that since there is provided a retaining means for each tool, the same are held separated, in order that they may be easily and quickly found and the same are prevented from rattling one against the other. The construction of the loop member 7 also assists in the non-rattling feature of the invention. When the case or kit 3 is closed, the front and top are held in position by any suitable means, conveniently a clip or latch 8 projecting from the edge of the top 4 and engaging a lug or retaining device 8ª on the body portion of the casing. A lock 8ᵇ may be provided for holding the latch against separation. The vertical flat extension 2ᶜ of the foot rest 2 is secured to the rear surface of the tool case, as by means of screws or bolts 9. It will be observed that the upright portion 2ᵇ of the bracket 2 is curved, whereby a portion of the spare tire which is adapted to fit about the tool case may rest within the bracket. Secured to the vehicle frame, as by means of screws or bolts 10ª, are brackets 10 having openings 10ᵇ adapted for the support of elongated rods 11, which are mounted in the openings or hanger brackets 12, one upon each side of the body portion of the casing, and secured thereto in any desired manner, as by screws or bolts 12ª. The rods 11 are secured to the brackets 10 and 12, as by thumb nuts 13. Sleeved upon the rods 11 are clamping arms 14, one upon each side of the brackets 12 and curved inwardly whereby to fit about opposite sides of a tire or spare wheel. These clamping arms are adjustably mounted upon the rods 11 for longitudinal movement about said rods, as well as rotary movement, the same being held in adjusted position by means of headed bolts 15.

Having thus described the various parts, the operation may be briefly set forth as follows: The attachment having been applied to the vehicle frame, one or both of the clamping arms 14 are loosened by the nut 15, whereby the same may swing to a position downwardly or in substantial alinement with the side of the tool casing (shown in Fig. 4) when the tire or spare wheel, or a plurality of each may be slid laterally over the tool casing into a position against the rearmost clamping arm of each pair and the upright arm 2ᵇ of the foot rest 2. When in this position, the loose clamping arms are swung about the rods 11 as a pivot and moved longitudinally of the rods (11) to a position against and overlapping the outer edge of said tires or spare wheels, when the bolts 15 are moved to holding position. The tires will, it will be appreciated, be held very rigidly and firmly in place and at the same time the same may be readily removed by simply swinging the outermost clamping arms 14 downwardly (Fig. 4). This peculiar form of retaining means for the tires does away with the usual method of strapping the tires in position, and results in a great saving of time. Now should it be desired to gain access to the interior of the tool case, this may be readily done without removing the tires from the supports carried by the tool casing, by simply removing the latch 8 from the retaining means 8ª, and swinging the top and front of the casing to the position illustrated in Fig. 2, when all the tools are accessible.

The peculiar arrangement of tool carrying means does away with the necessity of hunting through a tool box for the particular tool desired, prevents breakage of the tools, and obviates all rattling or unnecessary noise. Again, the annoyance, especially during inclement weather, of removing from their seats the occupants of the automobile is wholly dispensed with, an occurrence which is absolutely unavoidable where tools and appliances are carried beneath the seats. The novel form of attaching means for the spare wheel or tire and tool case makes it possible to have both at a position on the vehicle where they are most readily accessible, and therefore the device is not only practical, but adds to the appearance of an automobile to which it is attached.

Having thus described the invention, what I claim as new and desire to secure by Letters Patent is:

1. In an attachment of the character described, the combination of a supporting member adapted to be secured to a vehicle frame, oppositely disposed arms mounted on said support and adapted to engage over opposite sides of a tire mounted on the support, and mean for supporting a case also mounted on said support.

2. In an attachment of the character described, the combination of an elongated supporting rod having means at one end for securing the same to a vehicle frame, oppositely disposed supporting arms mounted on said rod and adapted to engage over opposite sides of a tire positioned on said rod between said arms, and a hanger bracket for supporting a case of a shape to conform to the periphery of the tire mounted on said rod intermediate said arms.

3. In an attachment of the character described, a tire supporting case, hanger brackets on opposite sides of the case, rods mounted on said brackets, tire engaging arms mounted on said rods adapted to engage opposite sides of a tire mounted on said supporting case, the said arms being relatively adjustable on the supporting rods, and means to engage the inner ends of said rods for securing the same to a vehicle frame.

4. In an attachment of the character described, a supporting case shaped to conform to the inner periphery of a tire to be mounted thereon, a support secured to said case adjacent the base thereof, and shaped to constitute an abutment for one side of the tire, and means at the opposite sides of the supporting case to engage over opposite sides of the tire for supporting the same in position.

5. In an attachment of the character described, a supporting case shaped to conform to the inner periphery of a tire to be mounted thereon, means at the opposite sides of the supporting case to engage over opposite sides of the tire for supporting the same in position, said means including relatively adjustable rigid arms, a supporting member for the latter, and means for securing said supporting member in position.

6. In an attachment of the character described, the combination of a supporting rod, oppositely disposed rigid arms on the rod curved throughout for engaging opposite surfaces of the tire, said arms being laterally adjustable toward and from one another, and means mounted on the rod for supporting a case at a point between said arms.

7. In an attachment of the character described, a supporting case, a hanger bracket secured to the side thereof, a support on the bracket, and tire engaging means on the support, and a foot rest for said case.

8. In an attachment of the character described, a supporting case, hanger brackets at the respective sides of the case, rods mounted in the respective brackets, and a pair of oppositely disposed tire engaging arms on each rod, said arms being adjustable on the rod, and means for maintaining the same in adjusted position, and means for attaching the rods to a vehicle frame.

9. In an apparatus of the character described, the combination of a supporting case shaped to conform to the curvature of a tire, hanger brackets at the respective sides of the case, and secured thereto, a support on the brackets, and tire engaging means on the support.

In testimony whereof I affix my signature in presence of two witnesses.

JOHN C. TEMPLE.

Witnesses:
 LESLIE W. PARCHER,
 LULU E. LINSCOTT.

---

Copies of this patent may be obtained for five cents each, by addressing the " Commissioner of Patents, Washington, D. C."